(12) United States Patent
Tanaka et al.

(10) Patent No.: US 7,643,587 B2
(45) Date of Patent: Jan. 5, 2010

(54) FREQUENCY OFFSET ESTIMATING METHOD AND FREQUENCY OFFSET CORRECTING APPARATUS UTILIZING SAID METHOD

(75) Inventors: Yasuhiro Tanaka, Ichinomiya (JP); Seigo Nakao, Gifu (JP); Nobuo Higashida, Moriguchi (JP)

(73) Assignees: Sanyo Electric Co., Ltd., Osaka (JP); NTT Data Sanyo Systems Corporation, Osaka (JP)

( * ) Notice: Subject to any disclaimer, the term of this patent is extended or adjusted under 35 U.S.C. 154(b) by 709 days.

(21) Appl. No.: 11/019,767

(22) Filed: Dec. 23, 2004

(65) Prior Publication Data

US 2005/0141658 A1 Jun. 30, 2005

(30) Foreign Application Priority Data

Dec. 25, 2003 (JP) .............................. 2003-429301

(51) Int. Cl.
*H04L 27/06* (2006.01)
(52) U.S. Cl. ...................... 375/344; 375/346; 375/316; 375/338
(58) Field of Classification Search ................. 375/346
See application file for complete search history.

(56) References Cited

U.S. PATENT DOCUMENTS

| | | | | |
|---|---|---|---|---|
| 5,303,263 A * | 4/1994 | Shoji et al. | ................. | 375/229 |
| 5,852,630 A * | 12/1998 | Langberg et al. | ............ | 375/219 |
| 6,738,608 B2 * | 5/2004 | Black et al. | ................. | 455/260 |
| 6,956,895 B2 * | 10/2005 | Vihriala | ...................... | 375/148 |
| 7,072,693 B2 * | 7/2006 | Farlow et al. | ............ | 455/562.1 |
| 7,088,782 B2 * | 8/2006 | Mody et al. | ................. | 375/260 |
| 2004/0095907 A1 * | 5/2004 | Agee et al. | ................. | 370/334 |
| 2004/0259508 A1 * | 12/2004 | Murakami et al. | ........... | 455/103 |
| 2005/0047384 A1 * | 3/2005 | Wax et al. | ................... | 370/338 |
| 2006/0120487 A1 * | 6/2006 | Nakao et al. | ................ | 375/334 |

FOREIGN PATENT DOCUMENTS

| JP | 10-210099 | 8/1998 |
|---|---|---|
| JP | 2001-285161 | 10/2001 |

OTHER PUBLICATIONS

Indian Office Action for corresponding Indian Patent Application No. 2530/del/2004 filed Dec. 22, 2004.
Japanese Office Action, with English translation, issued in Japanese Patent Application No. JP 2003-429301 dated on May 27, 2008.

* cited by examiner

*Primary Examiner*—Shuwang Liu
*Assistant Examiner*—Kenneth Lam
(74) *Attorney, Agent, or Firm*—McDermott Will & Emery LLP (57) ABSTRACT

A frequency offset correcting unit estimates frequency offsets in a preamble period, corrects digital received signals by the estimated initial frequency and further corrects them by residual frequency signals. A receiving weight vector computing unit computes receiving weight vector signals by using LMS algorithm. Based on the error vectors or receiving weight vector signals derived by LMS algorithm, the frequency offsets contained in corrected received signals are also estimated and are outputted as the residual frequency signals. A multiplier weights the corrected received signals with the receiving weight vector signals. An adder sums up outputs of the multiplier so as to output a synthesized signal.

12 Claims, 9 Drawing Sheets

→ PRESENT INVENTION
→ WITHOUT FREQUENCY OFFSET CORRECTION
→ WITHOUT FREQUENCY OFFSET

FREQUENCY OFFSET ESTIMATING METHOD AND FREQUENCY OFFSET CORRECTING APPARATUS UTILIZING SAID METHOD

BACKGROUND OF THE INVENTION

1. Field of the Invention

The present invention relates to the frequency offset estimating technology, and it particularly relates to a frequency offset estimating method for estimating frequency offsets contained in signals received by a plurality of antennas and a frequency offset correcting apparatus utilizing said method.

2. Description of the Related Art

In wireless communication, it is generally desired that the limited frequency resources be used effectively. One of the technologies that effectively utilize the frequency resources is adaptive array antenna technology. In the adaptive array antenna technology, the amplitude and phase of signals transmitted from and received by a plurality of antennas, respectively, are so controlled as to form a directional pattern of the antenna. In other words, the apparatuses provided with adaptive array antennas change respectively the amplitude and phase of signals received by the plurality of antennas, sum up respectively a plurality of the thus changed received signals, and receive the signals equivalent to the signals received by the antenna having the directional pattern corresponding to the variation in said amplitude and phase (hereinafter referred to as "weight"). In addition, signals are transmitted in a directional pattern of the antenna corresponding to the weight.

One example of processings to compute the weights in adaptive array antenna technology is a processing based on the MMSE (Minimum Mean Square Error) method. In the MMSE method, the Wiener solution is known to be the condition for an optimum weight value. Also known is a recurrence formula whose amount of calculation is smaller than directly solving the Wiener solution. For such recurrence formula, adaptive algorithms, such as RLS (Recursive Least Squares) algorithm and LMS (Least Mean Squares) algorithm, are used.

However, frequency offsets are present between carriers outputted from a local oscillator included in a transmitting apparatus and those outputted from a local oscillator included in a receiving apparatus, thus causing to generate phase errors. When QPSK (Quadrature Phase Shift Keying) is used as a frequency modulation scheme, the constellation of signals received by the receiving apparatus is rotated by phase error. In general, the rotation of constellation like this degrades the transmission quality of signals. When an adaptive algorithm is used in adaptive array antenna technique, there are some cases where the frequency offsets can be estimated in a form such that the frequency offsets are contained in the weight (See Reference (1) in the following Related Art List, for instance).

Related Art List (1) Japanese Patent Application Laid-Open No. Hei10-210099.

When the weight is to be calculated by using LMS algorithm as the adaptive algorithm, the frequency offsets can be also calculated in a form such that the frequency offsets are contained in the weight. However, the range in which the frequency offset can be calculated will be narrow in general. That is, the larger the frequency offset becomes, the harder the accurate estimation of said frequency offset will be. In addition, if the number of weights, namely, the number of antennas increases, the range in which the frequency offset can be calculated will be further narrowed. As one method, on the other hand, for broadening the range in which the frequency offset can be calculated using LMS algorithm, the method may be such that the step-size parameter of LMS algorithm is made small. According to this method, the filtering effect is small in general, thus resulting in the drop of signal transmission quality. When the multi-carrier scheme is used to transmit signals, the frequency offset gives rise to intercarrier interference, thus resulting in the further drop of signal transmission quality.

SUMMARY OF THE INVENTION

The present invention has been made in view of the foregoing circumstances and an object thereof is to provide a frequency offset estimating method for correcting frequency offsets contained among signals received by a plurality of antennas, respectively, and a frequency offset correcting apparatus utilizing said method.

A preferred embodiment according to the present invention relates to a frequency offset correcting apparatus. This apparatus comprises: a correcting unit which respectively corrects frequency offsets contained in a plurality of received signals that correspond respectively to a plurality antennas; a processing unit which derives a plurality of weighting factors corresponding respectively to the plurality of corrected received signals and error in the plurality of weight factors relative to a predetermined reference, respectively, by applying an adaptive algorithm to the plurality of corrected received signals; and an estimating unit which estimates respectively residual components of the frequency offsets contained in the plurality of corrected received signals, based on the plurality of derived weighting factors and the derived error. In this apparatus, the correcting unit may correct the frequency offsets respectively by reflecting the estimated residual components of frequency offsets.

By employing the above apparatus, the residual components of frequency offsets are estimated based on the weighting factors and error derived by the adaptive algorithm. As a result, the increase in operation amount can be suppressed and at the same time the residual components of frequency offsets can be made small, thus improving the signal transmission quality.

The apparatus may further comprise a frequency conversion unit which performs frequency conversion respectively on a plurality of radio frequency signals received respectively by the plurality of antennas, based on a plurality of oscillation signals outputted respectively from a plurality of frequency oscillators and which outputs the frequency-converted signals to the correcting unit as the plurality of received signals. As the residual components of frequency offsets the estimating unit may multiply respectively the derived error by complex conjugation of the plurality of corrected received signals and extract imaginary components from a division result where the multiplication result is divided by the plurality of derived weighting factors. The apparatus may further comprise a weighting unit which weights the plurality of corrected received signals with the plurality of derived weighting factors, respectively.

The apparatus may further comprise a frequency-domain conversion unit which converts respectively the plurality of corrected received signals to those in frequency domain and which outputs a plurality of signals in frequency domain for the respective plurality of corrected received signals, wherein the processing unit may derive respectively a plurality of weighting factors and errors corresponding respectively to the plurality of signals in frequency domain, by applying the adaptive algorithm to among the plurality of corrected received signals in units of one signal in frequency domain mutually associated thereamong, and wherein the estimating unit may estimate the residual components of frequency offsets, based on the plurality of weighting factors and errors corresponding respectively to the plurality of signals in frequency domain. The estimating unit may estimate the residual components of frequency offset over a period in which the plurality of corrected received signals are to be Fourier-transformed. The apparatus may further comprise a weighting unit which weights the plurality of signals in frequency domain with the plurality of derived weighting factors, respectively.

Another preferred embodiment according to the present invention relates to a frequency offset estimating method. This method is such that a plurality of weighting factors corresponding respectively to a plurality of received signals and error in the plurality of weighting factors relative to a predetermined reference are respectively derived by applying an adaptive algorithm to the plurality of received signals corresponding respectively to a plurality of antennas and then frequency offsets contained in the plurality of received signals are respectively estimated based on the plurality of derived weighting factors and error.

Still another preferred embodiment according to the present invention relates also to a frequency offset estimating method. This method comprises: correcting respectively frequency offsets contained in a plurality of received signals that correspond respectively to a plurality antennas; deriving a plurality of weighting factors corresponding respectively to the plurality of corrected received signals and error in the plurality of weight factors relative to a predetermined reference, respectively, by applying an adaptive algorithm to the plurality of corrected received signals; and estimating respectively residual components of the frequency offsets contained in the plurality of corrected received signals, based on the plurality of derived weighting factors and the derived error. In this method, the correcting may be such that the frequency offsets are corrected respectively by reflecting the estimated residual components of frequency offsets.

The method may further comprise performing frequency conversion respectively on a plurality of radio frequency signals received respectively by the plurality of antennas, based on a plurality of oscillation signals outputted respectively from a plurality of frequency oscillators and outputting the frequency-converted signals to the correcting as the plurality of received signals. The estimating may be such that, as the residual components of frequency offsets, the derived error is multiplied respectively by complex conjugation of the plurality of corrected received signals and then imaginary components are extracted from a division result where the multiplication result is divided by the plurality of derived weighting factors. The method may further comprise weighting the plurality of corrected received signals with the plurality of derived weighting factors, respectively.

The method may further comprise converting respectively the plurality of corrected received signals to those in frequency domain and outputting a plurality of signals in frequency domain for the respective plurality of corrected received signals, wherein the deriving may be such that a plurality of weighting factors and errors corresponding respectively to the plurality of signals in frequency domain are respectively derived by applying the adaptive algorithm to among the plurality of corrected received signals in units of one signal in frequency domain mutually associated thereamong, and wherein the estimating may be such that the residual components of frequency offsets are estimated based on the plurality of weighting factors and errors corresponding to the plurality of signals in frequency domain. The estimating may be such that the residual components of frequency offset are estimated over a period in which the plurality of corrected received signals are to be Fourier-transformed. The method may further comprise weighting the plurality of signals in frequency domain with the plurality of derived weighting factors, respectively.

Still another preferred embodiment according to the present invention relates to a program. This program, executable by a computer, includes the functions of: outputting, from a memory, frequency offsets contained in a plurality of received signals that correspond respectively to a plurality of antennas and correcting respectively the outputted frequency offsets; deriving a plurality of weighting factors corresponding respectively to the plurality of corrected received signals and error in the plurality of weighting factors relative to a predetermined reference, respectively, by applying an adaptive algorithm to the plurality of corrected received signals; and estimating respectively residual components of the frequency offsets contained in the plurality of corrected received signals, based on the plurality of derived weighting factors and the derived error. In this program, the correcting may be such that the frequency offsets stored in the memory is updated by the estimated residual components of the frequency offsets.

In this program, the estimating may be such that, as the residual components of frequency offsets, the derived error is multiplied respectively by complex conjugation of the plurality of corrected received signals and then imaginary components are extracted from a division result where the multiplication result is divided by the plurality of derived weighting factors. The program may further comprise the function of weighting the plurality of corrected received signals with the plurality of derived weighting factors, respectively.

The program may further comprise the function of converting respectively the plurality of corrected received signals to those in frequency domain and outputting a plurality of signals in frequency domain for the respective plurality of corrected received signals, wherein the deriving may be such that a plurality of weighting factors and errors corresponding respectively to the plurality of signals in frequency domain are respectively derived by applying the adaptive algorithm to among the plurality of corrected received signals in units of one signal in frequency domain mutually associated thereamong, and wherein the estimating may be such that the residual components of frequency offsets are estimated based on the plurality of weighting factors and errors corresponding respectively to the plurality of signals in frequency domain. The estimating may be such that the residual components of frequency offset are estimated over a period in which the plurality of corrected received signals are to be Fourier-transformed. The program may further comprise the function of weighting the plurality of signals in frequency domain with the plurality of derived weighting factors, respectively.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

First Embodiment

Before describing the present invention in a specific manner, the outline will be first described. A first embodiment according to the present invention relate to a base station apparatus which carries out adaptive array signal processing to a plurality of signals received respectively by a plurality of antennas, and it is herein assumed to be the base station apparatus in a personal handyphone system (PHS). The base station apparatus converts a plurality of received signals to a plurality of baseband signals by a plurality of carriers that correspond respectively to a plurality of antennas. The plurality of converted baseband signals respectively contain frequency offsets, and the respective frequency offset values differ among the plurality of baseband signals. The base station apparatus according to the present embodiment estimates coarsely or loosely the frequency offsets contained in the baseband signals, in a preamble in a leading portion among bursts containing the received signals, and corrects the estimated frequency offsets by feedforwad. Then, receiving weight vectors are computed for signals whose frequency offsets have been coarsely corrected, by using LMS algorithm, so as to execute adaptive array signal processing. Together with the adaptive array signal processing, the base station apparatus estimates residual components contained in the estimated frequency offsets by using error vectors or the like derived when LMS algorithm was applied, and corrects the thus estimated residual frequency offsets by subjecting them to a feedback.

Figure 1:
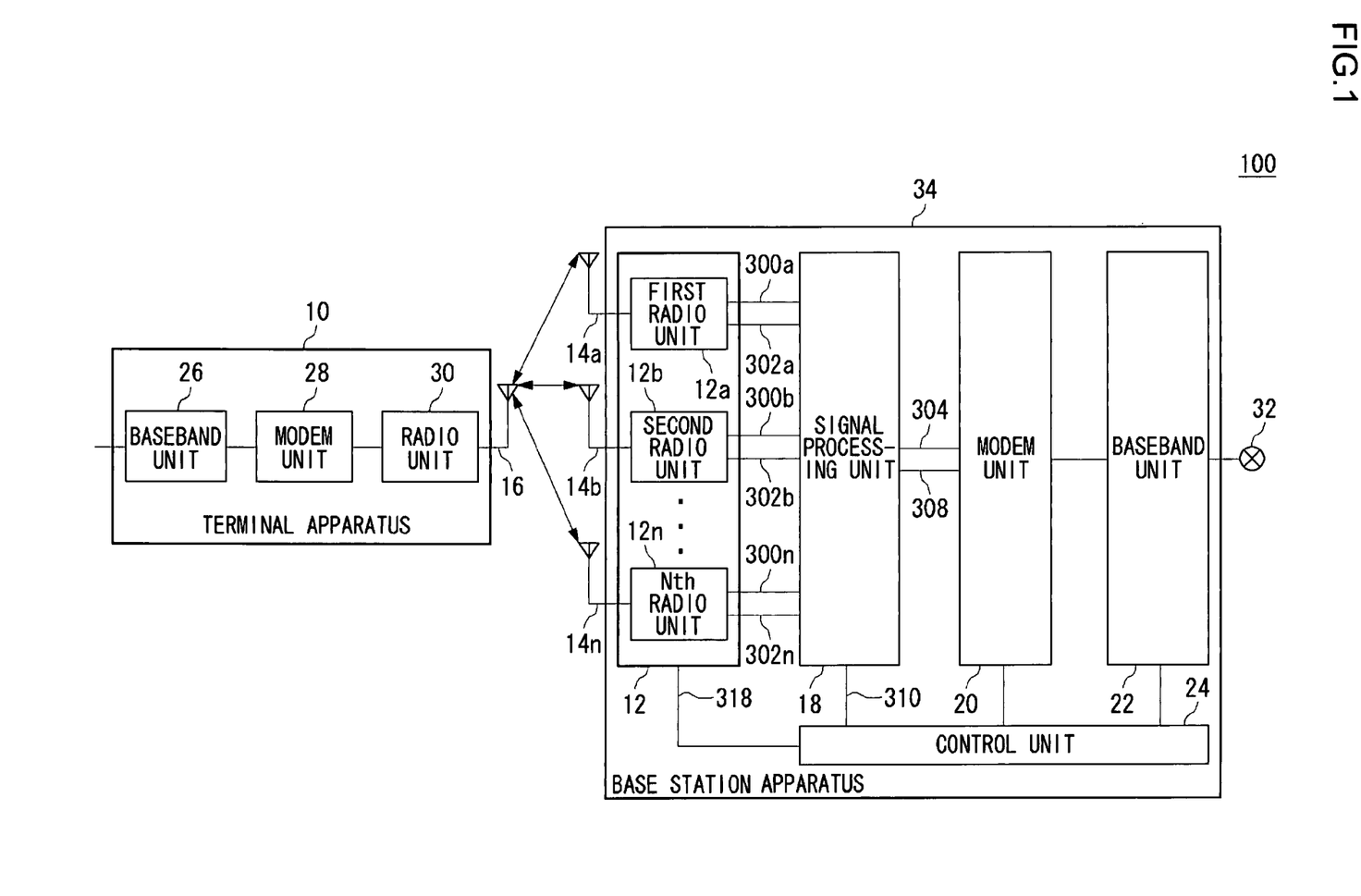
FIG. 1 shows a structure of a communication system according to a first embodiment of the present invention.

FIG. 1 shows a structure of a communication system 100 according to a first embodiment of the present invention. The communication system 100 includes a terminal apparatus 10, a base station apparatus 34 and a network 32. The terminal apparatus 10 includes a baseband unit 26, a modem unit 28, a radio unit 30 and an antenna 16 for use with terminal apparatus. The base station apparatus 34 includes a first basestation antenna 14a, a second basestation antenna 14b, ... and an Nth basestation antenna 14n, which are generically called antennas 14 for use with base station apparatus, a first radio unit 12a, a second radio unit 12b, ... and an Nth radio unit 12n, which are generically called radio units 12, a signal processing unit 18, a modem unit 20, a baseband unit 22 and a control unit 24. Moreover, the base station apparatus 34 includes as signals a first digital received signal 300a, a second digital received signal 300b, ... and an Nth digital received signal 300n, which are generically called digital received signals 300, a first digital transmitted signal 302a, a second digital transmitted signal 302b, ... and an Nth digital transmitted signal 302n, which are generically called digital transmitted signals 302, a synthesized signal 304, a pre-separation signal 308, a signal processor control signal 310 and a radio-unit control signal 318.

The baseband unit 22 in the base station apparatus 34 is an interface with the network 32. The baseband unit 26 in the terminal apparatus 10 is an interface with a PC connected to a terminal apparatus 10 or with an application inside the terminal apparatus 10. The baseband units 22 and 26 perform their respective transmission/receiving processings of information signals to be transmitted from and received by the communication system 100. The baseband units 22 and 26 may also carry out error correction or automatic retransmission processing, but the description of such processings is omitted here.

As a modulation processing, the modem unit 20 in the base station apparatus 34 and the modem unit 28 in the terminal apparatus 10 modulate carriers with information signals and generate signals to be transmitted. Here, $\pi/4$ shift QPSK is used as a modulation scheme. As a demodulation processing, the modem units 20 and 28 also demodulate received signals and reproduce the transmitted information signals.

The signal processing unit 18 performs a signal processing necessary for a transmission/receiving processing of adaptive array antennas.

The radio units 12 in the base station apparatus 34 and the radio unit 30 in the terminal apparatus 10 carry out frequency conversion processing between baseband signals and radio frequency signals, which are processed by the signal processing unit 18, the modem unit 20, the baseband unit 22, baseband unit 26 and the modem unit 28, amplification processing, A-D or D-A conversion processing and the like.

The basestation antennas 14 in the base station apparatus 34 and the terminal antenna 16 in the terminal apparatus 10 perform transmission/receiving processings on radio frequency signals. The directivity of the respective antennas may be arbitrary and the number of basestation antennas 14 is denoted by N.

The control unit 24 controls timings for the radio unit 12, the signal processing unit 18, the modem unit 20 and the baseband unit 22. The control unit 24 controls channel allocation.

Figure 2:
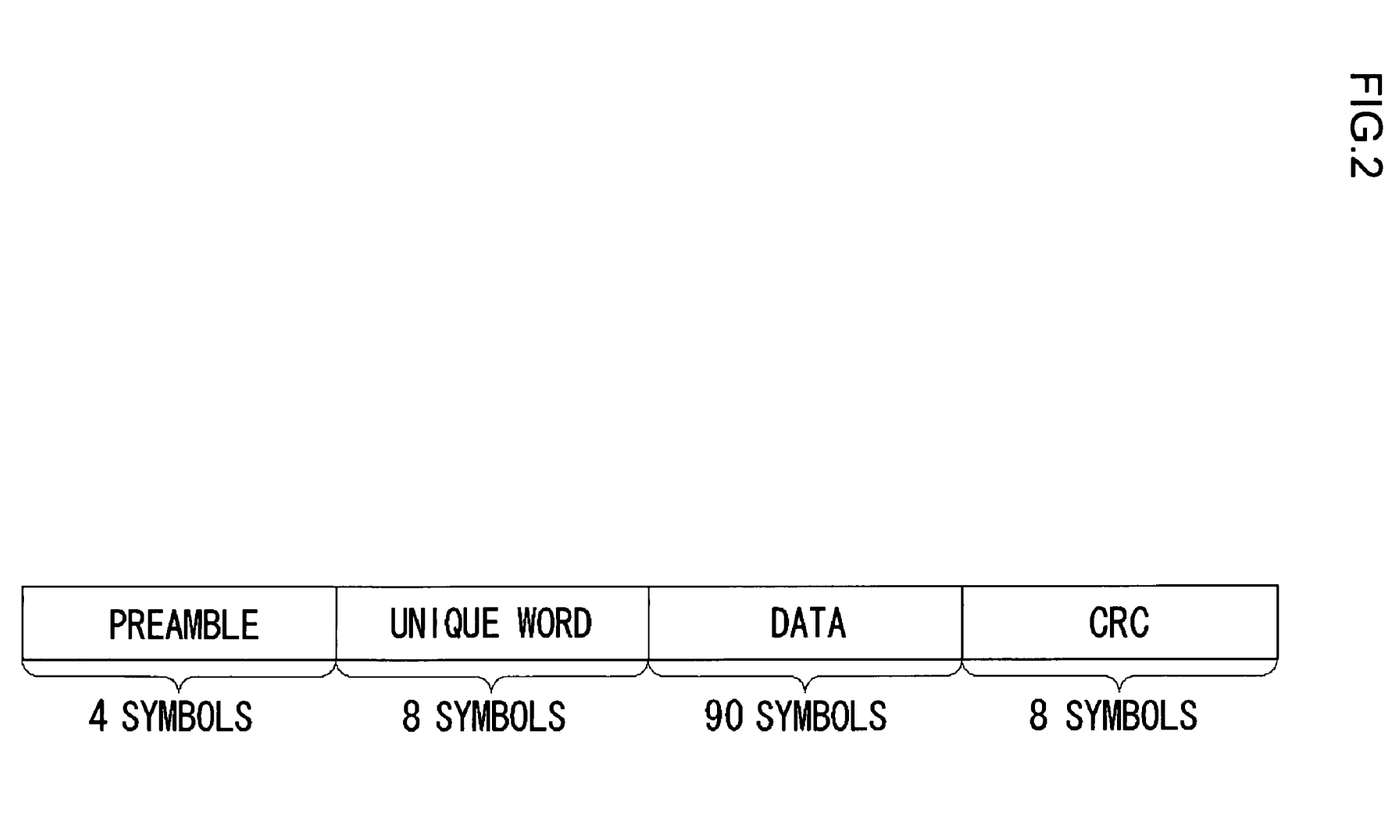
FIG. 2 shows a structure of a burst format according to the first embodiment.

FIG. 2 shows a structure of a burst format according to the first embodiment. Shown here is a burst format of a personal handyphone system (PHS). A preamble to be used for timing synchronization is placed in the four leading symbols of the burst, and a unique word is placed in the subsequent 8 symbols. Since the preamble and the unique word are known signals to the terminal apparatus 10 and the base station apparatus 34, they can be used as a training signal, which will be described later.

Figure 3:
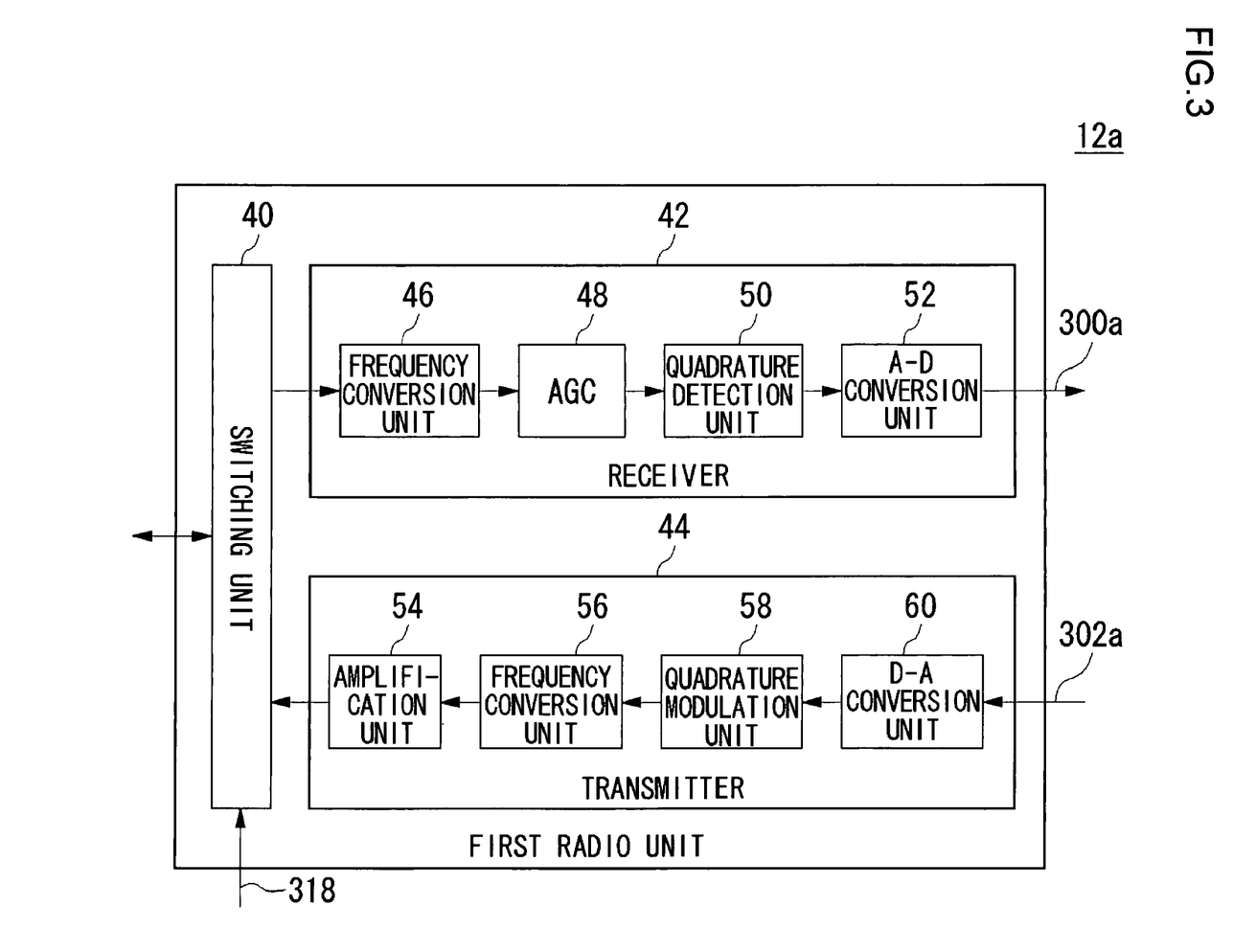
FIG. 3 shows a structure of the first radio unit shown in FIG. 1.

FIG. 3 shows a structure of a first radio unit 12a. The first radio unit 12a includes a switching unit 40, a receiver 42 and a transmitter 44. The receiver 42 includes a frequency conversion unit 46, an AGC (Automatic Gain Control) 48, a quadrature detection unit 50 and an A-D conversion unit 52. The transmitter 44 includes an amplification unit 54, a frequency conversion unit 56, a quadrature modulation unit 58 and a D-A conversion unit 60.

The switching unit 40 switches input and output of signals to the receiver 42 and the transmitter 44 according to radio-unit control signals 318 from the control unit 24, which is not shown in FIG. 3. That is, the switching unit 40 selects the signals from the transmitter 44 at the time of transmission whereas it selects the signals to the receiver 42 at the time of receiving.

The frequency conversion unit 46 in the receiver 42 and the frequency conversion unit 56 in the transmitter 44 perform frequency conversion on targeted signals between radio frequencies and intermediate frequencies. Though not shown here, a frequency oscillator is provided for each one of the radio units 12 to carry out the frequency conversions at the frequency conversion unit 46 and the frequency conversion unit 56, so that a plurality of frequency oscillators are provided for a plurality of radio units 12. The plurality of frequency oscillators operate independently from one other.

The AGC 48 controls gain automatically to make the amplitude of a received signal an amplitude which is within the dynamic range of the A-D conversion unit 52.

The quadrature detection unit 50 generates baseband analog signals by performing quadrature detection on intermediate frequency signals. On the other hand, the quadrature modulation unit 58 generates intermediate-frequency signals by performing quadrature modulation on the baseband analog signals.

The A-D conversion unit 52 converts baseband analog signals to digital signals whereas the D-A conversion unit 60 converts baseband digital signals to analog signals.

The amplification unit 54 amplifies radio frequency signals to be transmitted.

Figure 4:
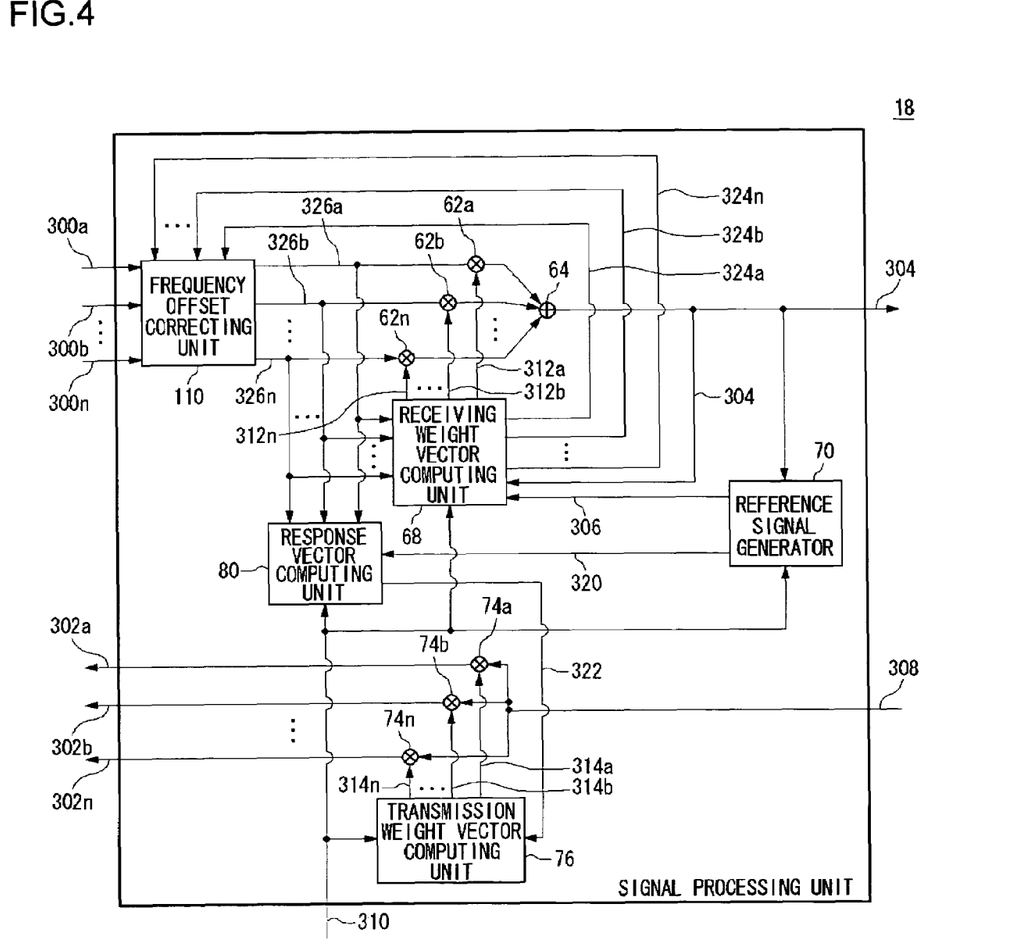
FIG. 4 shows a structure of the signal processing unit shown in FIG. 1.

FIG. 4 shows a structure of a signal processing unit 18. The signal processing unit 18 includes a frequency offset correcting unit 110, a first multiplier 62a, a second multiplier 62b, . . . and an Nth multiplier 62n, which are generically called multipliers 62, and an adder 64, a receiving weight vector computing unit 68, a reference signal generator 70, a first multiplier 74a, a second multiplier 74b, . . . and an Nth multiplier 74n, which are generically called multipliers 74, a transmission weight vector computing unit 76 and a response vector computing unit 80. Signals involved in the signal processing unit 18 include a weight reference signal 306, a first receiving weight vector signal 312a, a second receiving weight vector signal 312b, . . . and an Nth receiving weight vector signal 312n, which are generically called receiving weight vector signals 312, a first transmission weight vector signal 314a, a second transmission weight vector signal 314b, . . . and an Nth transmission weight vector signal 314n, which are generically called transmission weight vector signals 314, a response reference signal 320, a response vector signal 322, a first residual frequency signal 324a, a second residual frequency signal 324b, . . . and an Nth residual frequency signal 324n, which are generically called residual frequency signals 324, and a first corrected received signal 326a, a second corrected received signal 326b, . . . and an Nth corrected received signal 326n, which are generically called corrected received signals 326.

The frequency offset correcting unit 110 inputs the digital received signals 300, corrects frequency offsets thereof and then outputs those signals, whose frequency offsets have been corrected, as corrected received signals 326. Though details will be described later, in a preamble period the frequency offset correcting unit 110 estimates frequency offsets (hereinafter referred to as "initial frequency offsets"), corrects the digital received signals 300 with the thus estimated initial frequency offsets and also corrects them with the residual frequency signals 324 described later.

Using LMS algorithm, the receiving weight vector computing unit 68 computes receiving weight vector signals 312 necessary for weighting the corrected digital received signals 326 from the corrected digital received signals 326, synthesized signal 304 and weight reference signal 306. The receiving weight vector computing unit 68 also estimates frequency offsets contained in the corrected received signals 326 (hereinafter referred to as "residual frequency offsets") based on error vectors derived by LMS algorithm or the receiving weight vector signals 312, and outputs the thus estimated frequency offsets as the residual frequency signals 324.

The multipliers 62 weight the corrected received signals 326 with the receiving weight vector signals 312. The adder 64 sums up the outputs of the multipliers 62 so as to output the synthesized signal 304.

During a training period, the reference signal generator 70 outputs a training signal stored in advance as a weight reference signal 306 and a response reference signal 320. After the training period, the synthesized signal 304 is compared to a predefined threshold value and then the result of comparison is outputted as a weight reference signal 306 and a response reference signal 320. The decision may not necessarily be a hard decision but it may also be a soft decision.

From the corrected received signal 326 and the response reference signal 320, the response vector computing unit 80 computes the response vector signal 322 as a receiving response characteristic of a received signal against a transmitted signal. Though the method for computing the response vector signals 322 may be arbitrary, a method carried out here is based on a correlation processing, for example, as will be explained hereinafter. It is assumed herein that the corrected received signals 326 and the response reference signals 320 are inputted not only from within the signal processing unit 18 but also from signal processing units corresponding to other user terminal apparatuses via signal lines, which are not shown here. If a corrected received signal 326 corresponding to a first terminal apparatus is designated as $x_1(t)$, a corrected received signal 326 corresponding to a second terminal apparatus as $x_2(t)$, a response reference signal 320 corresponding to the first terminal apparatus as $S_1(t)$ and a response reference signal 320 corresponding to the second terminal apparatus as $S_2(t)$, then $x_1(t)$ and $x_2(t)$ will be expressed by the following Equation (1):

$$x_1(t)=h_{11}S_1(t)+h_{21}S_2(t)$$

$$x_2(t)=h_{12}S_1(t)+h_{22}S_2(t) \quad (1)$$

where $h_{ij}$ is the response characteristic from an ith terminal apparatus to a jth basestation antenna 14j, with noise ignored. A first correlation matrix $R_1$, with E as an ensemble average, is expressed by the following Equation (2):

$$R_1 = \begin{bmatrix} E[x_1 S_1^*] & E[x_2 S_1^*] \\ E[x_1 S_2^*] & E[x_2 S_2^*] \end{bmatrix} \quad (2)$$

A second correlation matrix $R_2$ for computing the correlation among the response reference signals 320 is given by the following Equation (3):

$$R_2 = \begin{bmatrix} E[S_1 S_1^*] & E[S_1^* S_2] \\ E[S_2 S_1^*] & E[S_2^* S_2] \end{bmatrix} \quad (3)$$

Finally, the first correlation matrix $R_1$ is multiplied by the inverse matrix of the second correlation matrix $R_2$ so as to obtain a response vector signal 322, which is expressed by the following Equation (4):

$$\begin{bmatrix} h_{11} & h_{12} \\ h_{21} & h_{22} \end{bmatrix} = R_1 R_2^{-1} \quad (4)$$

The transmission weight vector computing unit 76 estimates the transmission weight vector signal 314 necessary for weighting the pre-separation signal 308, from the receiving weight vector signal 312 or the response vector signal 322 that reflects receiving response characteristics. The method for estimating the transmission weight vector signals 314 may be arbitrary. As a most simple method therefor, however, the receiving weight vector signal 312 or the response vector signal 322 may be used as it is. As another method, the receiving weight vector signal 312 or the response vector signal 322 may be corrected using a conventional technique while the Doppler frequency variation of a propagation environment between the timing of a receiving processing and the timing of a transmission processing is taken into account. It is assumed herein that as the transmission weight vector signal 314 the response vector signal 322 is used as it is.

The multipliers 74 weight the pre-separation signal 308 by the transmission weight vector signals 314 respectively so as to output the digital transmitted signals 302. It is assumed herein that the timing in the above operation follows the signal processor control signal 310.

In terms of hardware, the above-described structure can be realized by a CPU, a memory and other LSIs of an arbitrary computer. In terms of software, it is realized by memory-loaded programs which have a reserved management function or the like, but drawn and described herein are function blocks that are realized in cooperation with those. Thus, it is understood by those skilled in the art that these function blocks can be realized in a variety of forms such as by hardware only, software only or the combination thereof.

Figure 5:
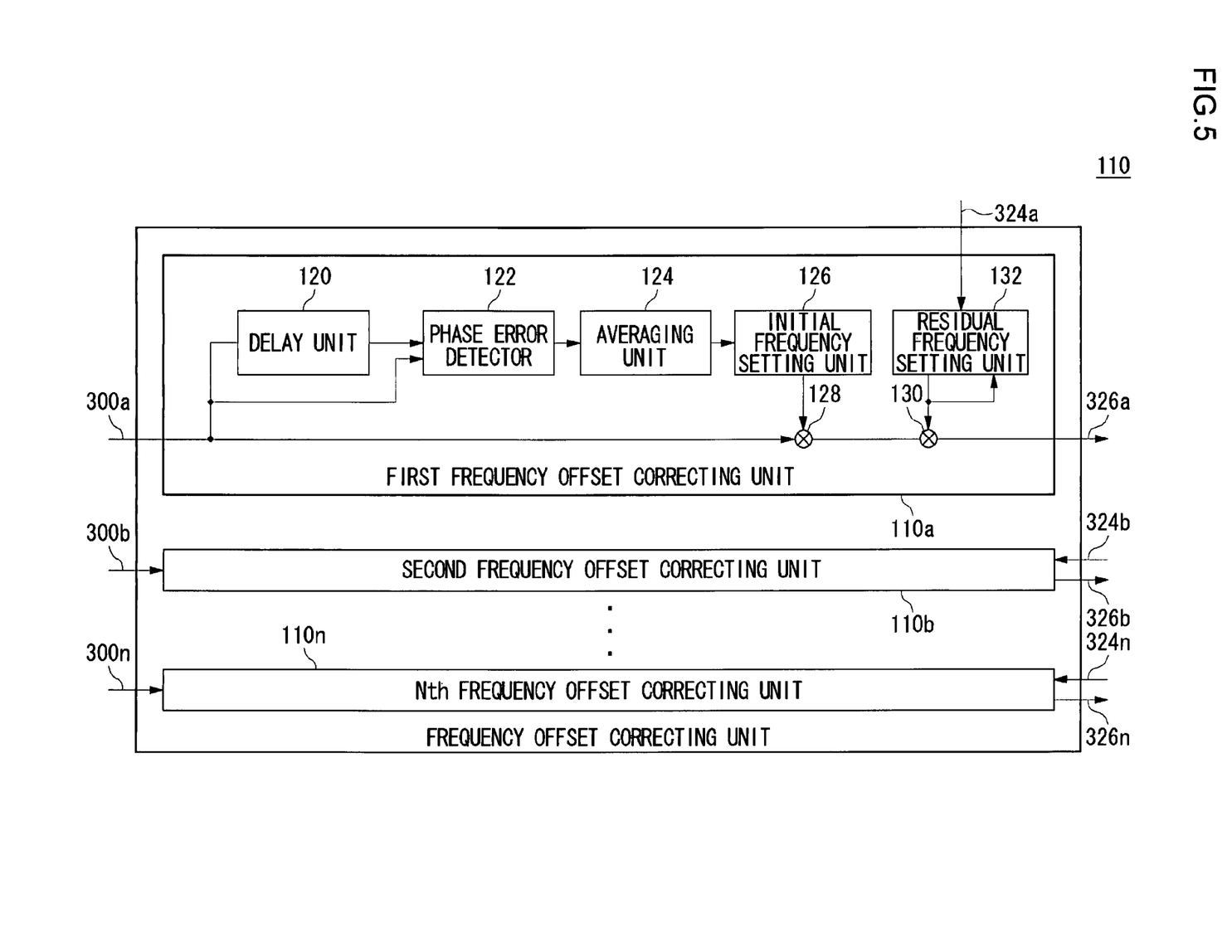
FIG. 5 shows a structure of the frequency offset correcting unit shown in FIG. 4.

FIG. 5 shows a structure of a frequency offset correcting unit 110. The frequency offset correcting units 110 are a generic name given for a first frequency offset correcting unit 110a, a second frequency offset correcting unit 110b, ... and an Nth frequency offset correcting unit 10n. Each of the frequency offset correcting units 110 includes a delay unit 120, a phase error detector 122, an averaging unit 124, an initial frequency setting unit 126, a multiplier 128, a multiplier 130 and a residual frequency setting unit 132.

The delay unit 120 delays the inputted digital received signals 300. Here, the delay unit 120 delays them by one symbol. The phase error detector 122 detects phase error between the delayed digital received signal 300 and the inputted digital received signal 300. This phase error corresponds to a rotation amount of phase in one symbol due to the frequency offset. If the digital received signals 300 contain signal components, the signal components are removed. The averaging unit 124 averages out the phase error detected by the phase error detector 122, for the purpose of suppressing noise components. The initial frequency setting unit 126 sets the phase error averaged by the averaging unit 124 as a phase error corresponding to the initial frequency offset, and outputs signals to be oscillated based on the initial frequency offset. The multiplier 128 multiplies the signals to be oscillated based on the initial frequency offset outputted from the initial frequency setting unit 126, by the inputted digital received signals 300 so as to remove the initial frequency offset components from the inputted digital received signals 300.

The residual frequency setting unit 132 sets the residual frequency offsets by successively updating them with the residual frequency signals 324 which have been inputted externally, and outputs signals which are oscillated based on the mostly recently updated residual frequency offsets. Here, since the residual frequency signals 324 are inputted after a training signal interval has been terminated, the signals which are oscillated based on the residual frequency offsets are outputted after the training signal has been terminated. The multiplier 130 multiplies output signals from the multiplier 128 by outputs signals from the residual frequency setting unit 132 so as to remove the residual frequency offsets contained in the output signals from the multiplier 128, and it outputs the resulting signals as corrected received signals 326.

Figure 6:
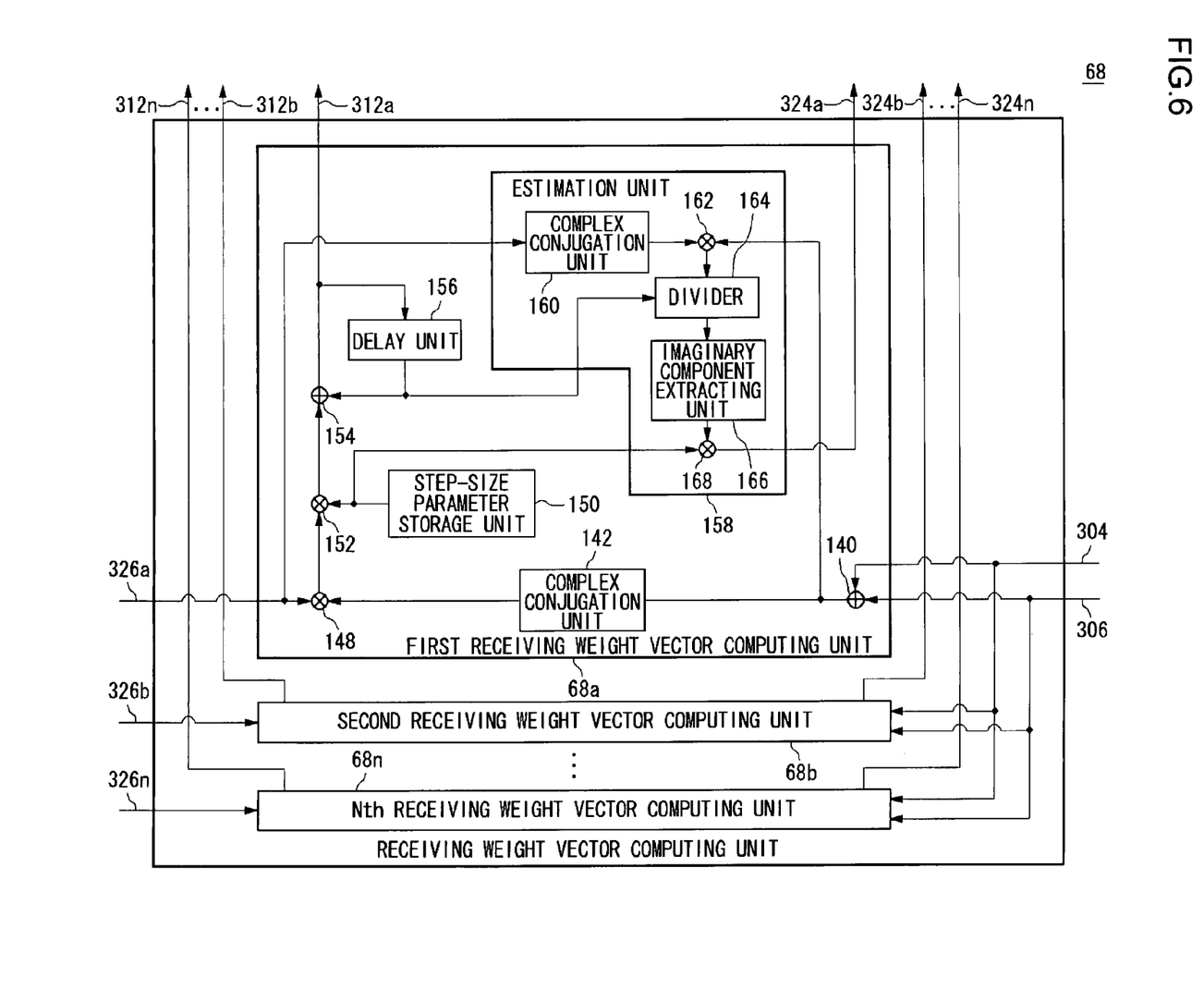
FIG. 6 shows a structure of receiving weight vector computing units shown in FIG. 4.

FIG. 6 shows a structure of receiving weight vector computing units 68. The receiving weight vector computing units 68 are a generical name given for a first receiving weight vector computing unit 68a, a second receiving weight vector computing unit 68b, ... and an Nth receiving weight vector computing unit 68n. Each of the receiving weight vector computing units 68 includes an adder 140, a complex conjugation unit 142, a multiplier 148, a step-size parameter storage unit 150, a multiplier 152, an adder 154, a delay unit 156 and an estimation unit 158. The estimation unit 158 includes a complex conjugation unit 160, a multiplier 162, a divider 164, an imaginary component extracting unit 166 and a multiplier 168.

The adder 140 computes the difference between the synthesized signal 304 and the weight reference signal 306, and outputs an error signal, namely, an error vector. This error signal is subjected to a complex conjugation conversion by the complex conjugation unit 142.

The multiplier 148 multiplies the complex-conjugation-converted error signal by the first corrected received signal 362a so as to generate a first multiplication result.

The multiplier 152 multiplies the first multiplication result by a step-size parameter stored in the step-size parameter storage unit 150 so as to generate a second multiplication result. The second multiplication result is subjected to a feedback by the delay unit 156 and the adder 154 and is then added with a new second multiplication result. In this manner, the result of addition updated successively by the LMS algorithm is outputted as a receiving weight vector 312.

The estimation unit 158 estimates residual frequency offsets. Before describing each component of the estimation unit 158, an overall operation of an estimation unit 158 will be outlined. It is assumed herein that a receiving weight vector corresponds to a receiving weight vector signal 312, a receiving weight vector at time t is designated as W(t) and a phase φ corresponds to the residual frequency offset contained in the corrected received signal 326. Then, a receiving weight vector W(t+1) is expressed by the following Equation (5):

$$W(t+1) = W(t)\exp(j\phi) \quad (5)$$

If error between the receiving weight vectors W(t+1) and W(t) is Δ, a relationship between the receiving weight vectors W(t+1) and W(t) is expressed by the following Equation (6):

$$W(t+1) = W(t) + \Delta \quad (6)$$

Combining or equating the above Equation (5) and Equation (6) results in:

$$W(t)\exp(j\phi) = W(t) + \Delta \quad (7)$$

If the phase φ is small, the Equation (7) is expressed by:

$$W(t) \cdot j\phi = \Delta \quad (8)$$

Hence, the phase φ is expressed by:

$$\phi = \operatorname{Im} g\left(\frac{\Delta}{W(t)}\right) \quad (9)$$

where "Img" indicates the imaginary component. If the Equation (6) is associated to a recurrence fomula of LMS algorithm, the error will be expressed by:

$$\Delta = \mu \cdot X^*(t) \cdot e(t) \quad (10)$$

where μ is a step-size parameter in LMS algorithm, X is a vector that corresponds to a corrected received signal 326, and e indicates a vector that corresponds to an error signal in LMS algorithm. Hence, the phase φ to be estimated is expressed by:

$$\phi = \operatorname{Im} g\left(\frac{\mu X^*(t)e(t)}{W(t)}\right) = \mu \operatorname{Im} g\left(\frac{X^*(t)e(t)}{W(t)}\right) \quad (11)$$

That is, the estimation unit 158 is so structured as to compute the Equation (11).

The complex conjugation unit 160 performs complex conjugation conversion on corrected received signals 326. The multiplier 162 multiplies the complex-conjugation-converted corrected received signal 326 by the error signal outputted from the adder 140. The divider 164 divides a multiplication result obtained by the multiplier 162 by a receiving weight vector signal 312 outputted from the delay unit 156. The imaginary component extracting unit 166 extracts imaginary components from a division result. The multiplier 168 multiplies the imaginary components in the division result by a step-size parameter so as to generate and output residual frequency signals 324.

Figure 7:
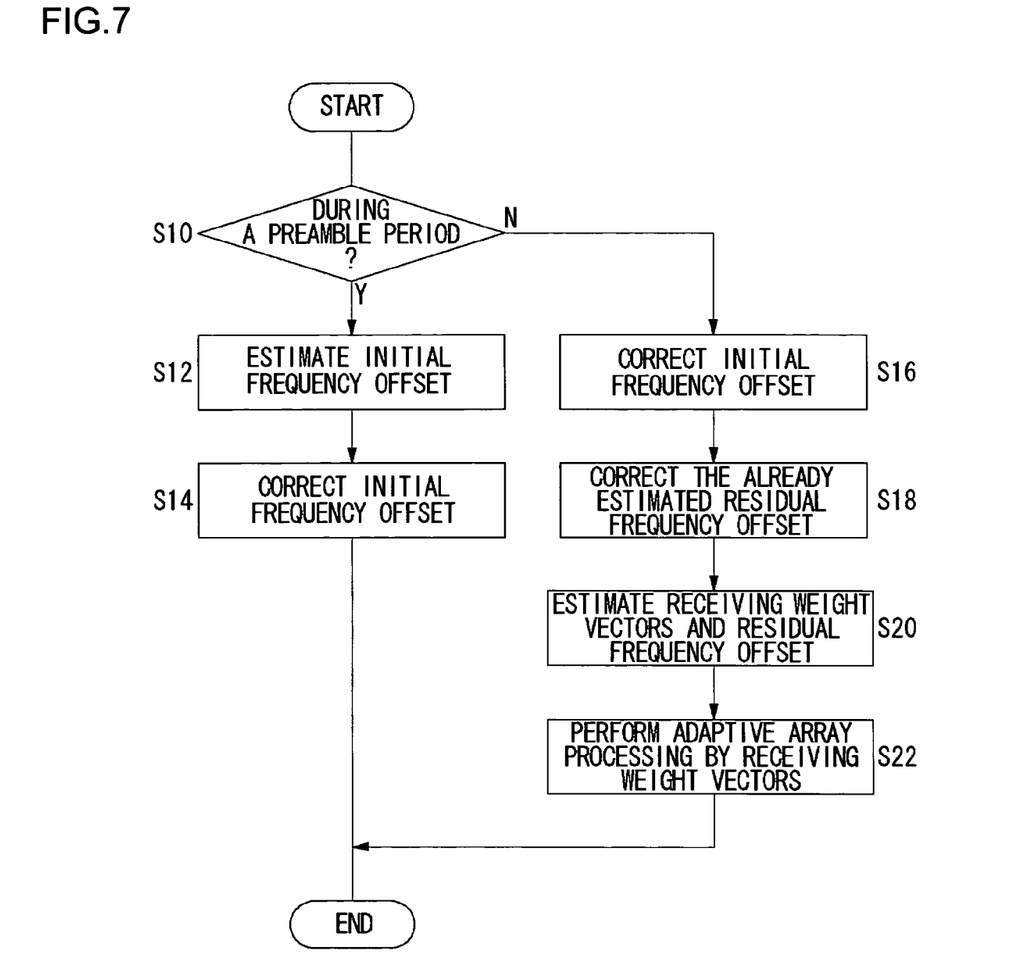
FIG. 7 is a flowchart showing a procedure of correcting frequency offsets as shown in FIG. 4.

FIG. 7 is a flowchart showing a procedure of correcting frequency offsets. During a period of preamble signal (Y of S10), the delay unit 120, phase error detector 122 and averaging unit 124 estimate initial frequency offsets (S12). When the estimation has been completed, the initial frequency setting unit 126 sets the estimated initial frequency offsets and the multiplier 128 corrects the initial frequency offsets contained in the digital received signals 300 (S14). When the preamble period terminates (N of S10), the multiplier 128 corrects the initial frequency offsets contained in the digital received signals 300 (S16).

Then the residual frequency setting unit 132 and multiplier 130 the already-estimated residual frequency signals 324 (S18) and output the corrected received signals 326. If a training signal period is taking place even after the termination of a preamble signal period, this step (S18) will not be executed because the residual frequency signal 324 has not been estimated. The receiving weight vector computing unit 68 estimates, from the corrected received signals 326, receiving weight vector signals 312 and residual frequency signals 324 (S20). Then, the residual frequency signals 324 are fed back to the residual frequency setting unit 132 and based on the receiving weight vector signals 312 the multiplier 62 and adder 64 perform adaptive array processing on the corrected received signals 326 so as to output a synthesized signal 304.

An operation of the base station apparatus 34 that employs the above structure will be described hereinbelow. During a preamble signal period of received burst, the delay unit 120, phase error detector 122 and the averaging unit 124 estimate initial frequency offsets contained in digital received signals 300. During a training signal period, output signals from the multiplier 128 are outputted as the corrected received signals 326. The corrected received signals 326 are inputted to the receiving weight vector computing unit 68, and the receiving weight vector computing unit 68 estimates receiving weight vector signals 312 and residual frequency signals 324. After the corrected received signals 326 have been weighted with the receiving weight vector signals 312 by the multipliers 62, the thus weighted signals 326 are summed by the adder 64 so as to be outputted as a synthesized signal 304. After the termination of a training signal period, the output signals from the multiplier 128 are corrected, by the multiplier 130, with residual frequency error based on the residual frequency signal 324 and are then outputted as the corrected received signals 326. The corrected received signals 326 are inputted to the receiving weight vector computing unit 68, and the receiving weight vector computing unit 68 estimates receiving weight vector signals 312 and residual frequency signals 324. After the corrected received signals 326 have been weighted with the receiving weight vector signals 312 by the multipliers 62, the thus weighted signals are summed by the adder 64 so as to be outputted as a synthesized signal 304.

According to the first embodiment, the initial frequency offsets are corrected by the feedforward prior to computing the receiving weight vectors and the residual components of frequency offsets are corrected in parallel with the receiving weight vectors. Thus, the frequency offsets can be corrected when the frequency offset is large. Moreover, there is no need to change parameters necessary for obtaining the receiving weight vectors in adaptive algorithm. Thus, the deterioration of signal transmission quality due to noise can be prevented. Moreover, values computed in a process of adaptive algorithm can also be used in computing the residual components of frequency offsets, so that the increase in circuit scale can be suppressed.

Second Embodiment

A second embodiment according to the present invention, similar to the first embodiment, relates to a base station apparatus which performs adaptive array signal processing on a plurality of signals received by a plurality of antennas, and it is assumed here that the received signals are multi-carrier signals and, in particular, those modulated by OFDM (Orthogonal Frequency Division Multiplexing). The base station apparatus according to the second embodiment corrects frequency offsets before it executes FFT (Fast Fourier Transform). And the base station apparatus applies LMS algorithm to the FFT-performed signals and then estimates receiving weight vectors and residual frequency offsets. Then, the thus estimated residual frequency offsets are fed back to a stage that precedes the FFT-performing stage.

Before describing the second embodiment in detail, how the phase of an FFT-performed signal rotates if frequency offset is present in a received signal will be explained first. A signal transmitted from a transmitting apparatus is expressed by:

$$S = A(A_1 \exp(j\omega_1 t) + A_2 \exp(j\omega_2 t) + A_3 \exp(j\omega_3 t) + \ldots + A_n \exp(j\omega_n t)) \quad (12)$$

where $A_1$ to $A_n$ are each a vector that indicates a signal component contained in each sub-carrier. If frequency offset is added to a signal transmitted, then a received signal having such frequency offset is expressed by:

$$S\exp(j\omega t) = (A_1 \exp(j\omega_1 t) + A_2 \exp(j\omega_2 t) + A_3 \exp(j\omega_3 t) + \ldots + A_n \exp(j\omega_n t)) \exp(j\omega t) \quad (13)$$

When the frequency offset is small, $\exp(j\omega t)$ can be approximated to a constant C and the signal in Equation (13) can be expressed by:

$$SC = (A_1 \exp(j\omega_1 t) + A_2 \exp(j\omega_2 t) + A_3 \exp(j\omega_3 t) + \ldots + A_n \exp(j\omega_n t))C \quad (14)$$

When this signal is subjected to FFT, each sub-carrier is expressed as $CA_1$, $CA_2$ or the like. It is to be noted here that each sub-carrier signal is rotated by a phase that corresponds to its frequency offset.

Figure 8:
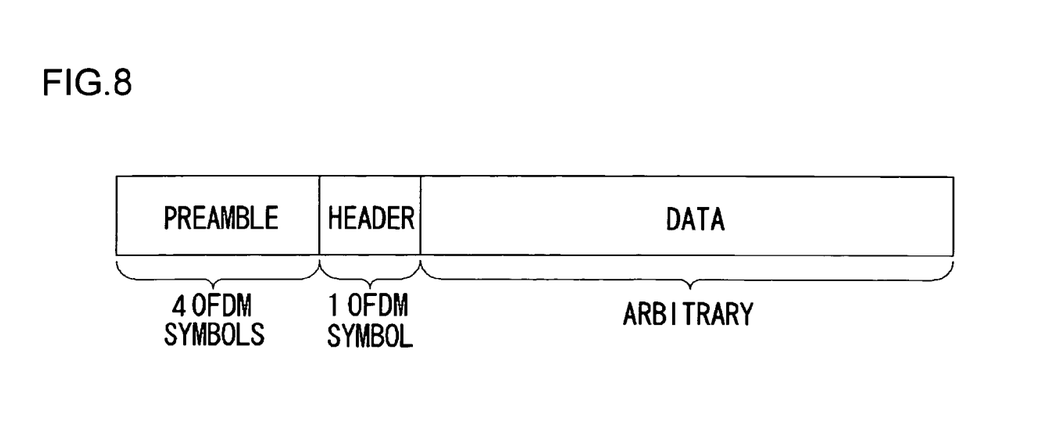
FIG. 8 shows a structure of a burst format according to a second embodiment of the present invention.

FIG. 8 shows a structure of a burst format according to the second embodiment. This is the burst format used in the traffic channel of IEEE802.11a which is one of wireless LANs (Local Area Networks). IEEE802.11a uses OFDM modulation scheme, and in the OFDM scheme the total of Fourier transform size and the number of symbols in guard interval constitutes a unit in general. In the present embodiment, this single unit is defined as OFDM symbols. A preamble which is to be used mainly for timing synchronization and carrier recovery is placed in the four leading symbols of a burst. Since the preamble signal is a signal known to the signal processing unit 18, the signal processing unit 18 can use a preamble as a training signal. "Header" and "data" that follow the "preamble" are signals which are not known to the signal processing unit 18 and they correspond to data signals.

Figure 9:
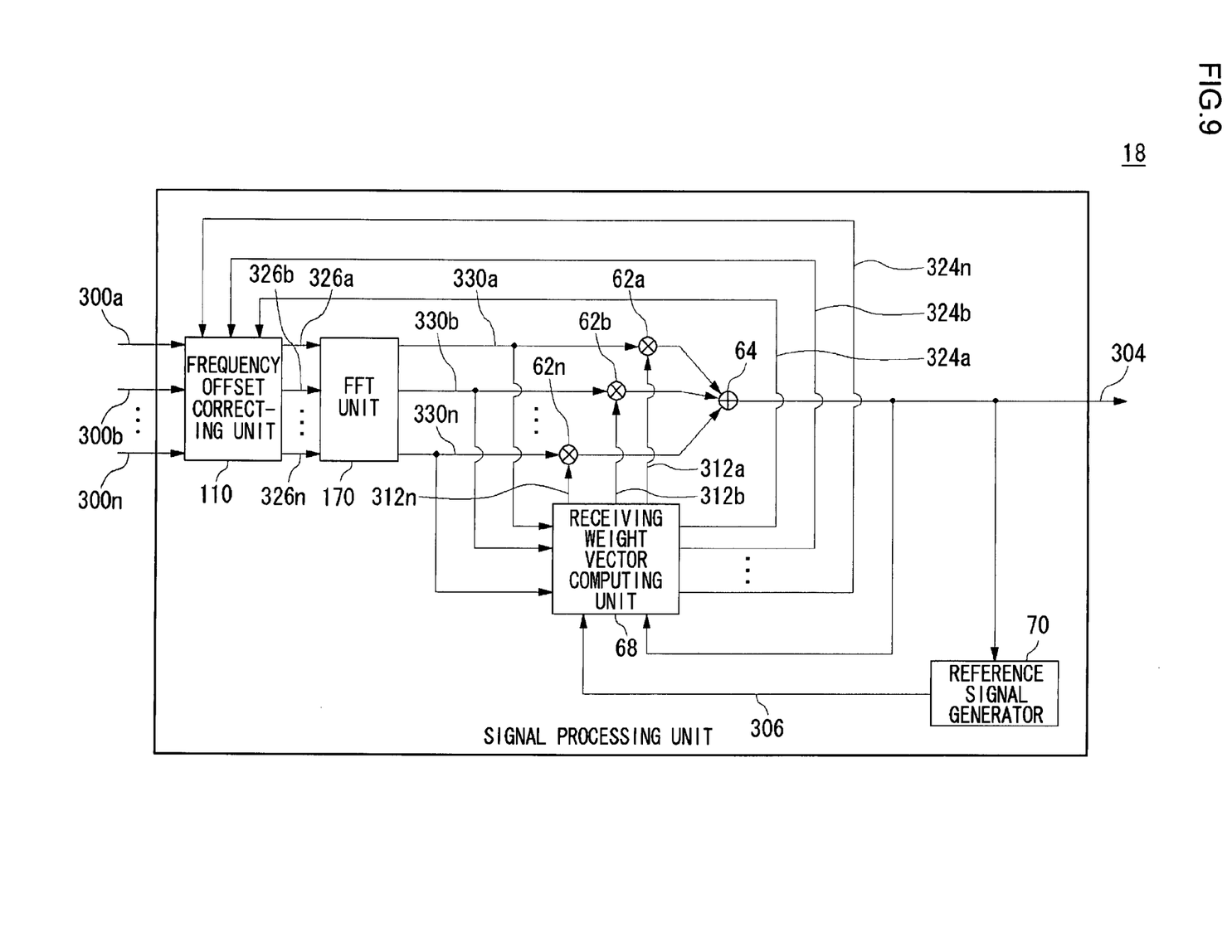
FIG. 9 shows a structure of a signal processing unit according to the second embodiment.

FIG. 9 shows a structure of a signal processing unit 18 according to the second embodiment. Functions relating to transmission as shown in FIG. 4 are omitted in the signal processing unit 18 shown in FIG. 9. Compared to the signal processing unit 18 shown in FIG. 4, an FFT unit 170 is newly added in the signal processing unit 18 of FIG. 9, and signals involved therein include a first frequency-domain signal 330a, a second frequency-domain signal 330b, ... and an Nth frequency-domain signal 330n, which are generically named frequency-domain signals 330.

Figure 10:
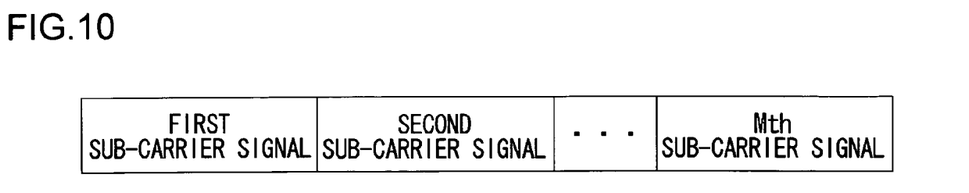
FIG. 10 shows a structure of a signal of FIG. 9 in time domain.

The FFT unit 170 performs Fourier transform on corrected received signals 326 and then outputs frequency-domain signals 330. It is assumed here that a single frequency-domain signal 330 is such that signals corresponding to sub-carriers are placed in series. This is illustrated in FIG. 10. In FIG. 10, the number of sub-carriers is M and only signals corresponding to one OFDM symbol are shown. That is, a plurality of OFDM symbol signals are realized by one OFDM symbol, as shown in FIG. 10, repeated a number of times.

Since the FFT unit 170 transforms the signals to those in frequency domain, the operation of the receiving weight vector computing unit 68, multiplier 62 and adder 64 are also changed in a form that corresponds accordingly thereto. That is, if the number of antennas is N and the number of sub-carriers is M as described earlier, LMS algorithm associated to a sub-carrier m is expressed by the following Equation (15).

$$W_m(t+1) = W_m(t) + \mu X_m(t) e^*(t)$$

$$e(t) = d(t) - W_m^H(t) X_m(t) \quad (15)$$

where $W_m(t)$ is a receiving response vector that corresponds to the sub-carrier m at time t, and the number of components is the number of antennas, that is, N. LMS algorithm is effected and applied to all sub-carriers, and processings by the multiplier 62 and adder 64 are also executed per sub-carrier. On the other hand, the residual frequency offset is expressed, per antenna, by the following Equation (16).

$$\phi = \mu \mathrm{Im} g \sum_{m=1}^{M} \left( \frac{X_m^*(t) e_m(t)}{W_m(t)} \right) \quad (16)$$

It is to be noted that the LMS algorithm in Equation (15) and the estimation of residual frequency offset in Equation (16) are executed, respectively, in units of 1 OFDM symbol.

Figure 11:
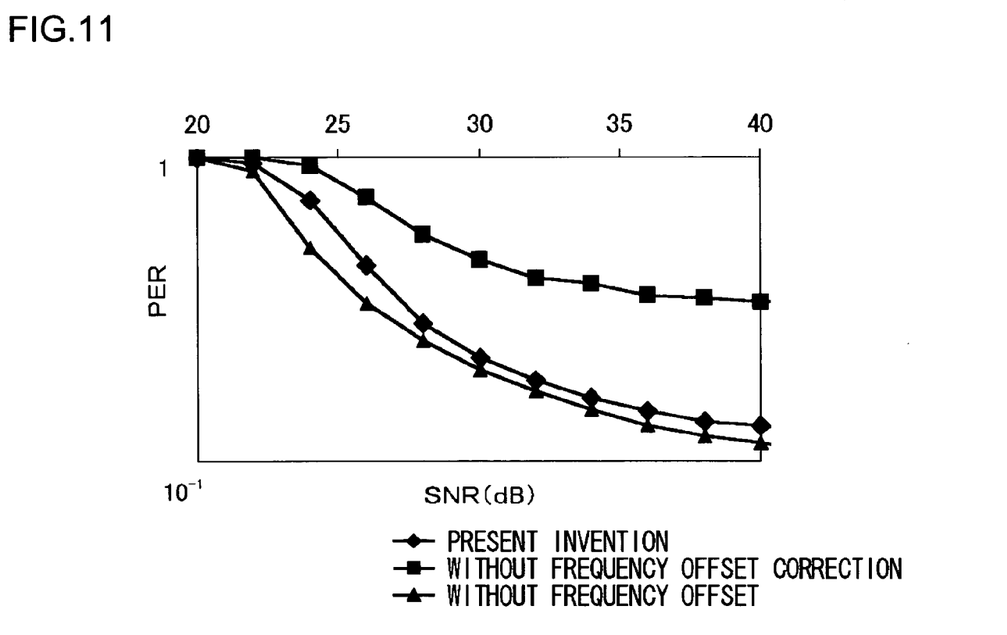
FIG. 11 is a result of simulation to illustrate an advantageous effect of the signal processing unit shown in FIG. 9.

FIG. 11 is a result of simulation to illustrate an advantageous effect of the signal processing unit 18. Here, the present embodiment is applied to a MIMO (Multiple Input Multiple Output) system. Here, the MIMO system is such that a base station apparatus 34 and a terminal apparatus 10 are each equipped with a plurality of antennas and a channel suitable for each of the antennas is set. That is, the channel of up to the maximum number of antennas is set for the communication between the base station apparatus 34 and the terminal apparatus 10, so as to improve the data transmission rate. It is to be noted here that the channel between the base station apparatus 34 and the terminal apparatus 10 is generally separated by the use of the adaptive antenna technology.

As conditions for simulation, a MIMO system is assumed where the number of antennas at a transmitting side is two whereas that at a receiving side is two. Also, the conditions are such that the number of sub-carriers and one OFDM symbol period are 52 and 4 μsec., respectively, in the OFDM modulation scheme, which are the same as in IEEE802.11a standard. Furthermore, the modulation scheme was 64QAM and PER (Packet Error Rate), which indicates a rate at which the error is contained under a Gaussian noise environment in units of burst, is measured. In order to particularly show how effective the estimation of residual frequency offsets is, the estimation and correction of initial frequency offsets are not carried out here, and 500 Hz is given as frequency offset. And convolution coding is used as an error correcting scheme and the coding rate is set to R=¾.

As is evident from FIG. 11, PER deteriorates if the estimation of residual frequency offsets is not carried out. That is, this is equivalent to indicating that the transmission quality deteriorates. On the other hand, if the estimation of residual frequency offsets is carried out, its PER is close to that having no frequency offset. This shows the advantageous effect in estimating the residual frequency offsets according to the present embodiment.

According to the present embodiments, even in a multicarrier system the initial frequency offsets are corrected by feedforward prior to computing the receiving weight vectors and the residual components in the frequency offsets are corrected in parallel with the processing of the receiving weight vectors. Thus, if the frequency offsets are large, they can be corrected. Moreover, the values which have been calculated and obtained in a processing of adaptive algorithm can be conveniently used also in computing the residual components of frequency offsets, so that the increase in circuit scale can be suppressed. Moreover, the multi-carrier transmission is more likely to suffer from the adverse effect of frequency offsets, compared to the case of a single carrier, so that the transmission quality of signals can be more improved than in the case of a signal carrier.

The present invention has been described based on the embodiments which are only exemplary. It is understood by those skilled in the art that there exist other various modifications to the combination of each component and process described above and that such modifications are encompassed by the scope of the present invention.

In the first and the second embodiment, the receiving weight vector computing unit 68 uses LMS algorithm as an adaptive algorithm by which to estimate the receiving weight vector signals 312. However, an adaptive algorithm other than LMS algorithm may be used in the receiving weight vector computing. For example, RLS algorithm may be used. According to this modified example, the timing at which the receiving weight vector signals 312 converge can be faster and the whole receiving processing can be done at high speed. That is, it suffices if receiving weight vectors and error vectors necessary for estimating residual frequency offsets are generated.

In the first embodiment, the delay unit 120 delays the digital received signal 300 by one symbol to estimate the initial frequency offsets. However, the embodiments are not limited thereto and, for example, the digital received signal 300 may be delayed by a plurality of symbols. According to this modified example, the accuracy of detecting the frequency offsets is improved. That is, the number of symbols to be delayed may be set in accordance with a value which is to be scheduled as a residual component of frequency offset.

Although the present invention has been described by way of exemplary embodiments and modified examples as above, it should be understood that many changes and substitutions may still further be made by those skilled in the art without departing from the scope of the present invention which is defined by the appended claims.

What is claimed is:

1. A frequency offset correcting apparatus, comprising:
a correcting unit which respectively corrects frequency offsets contained in a plurality of received signals that correspond respectively to a plurality antennas;
a processing unit which applies an adaptive algorithm to the plurality of corrected received signals so as to derive a plurality of weighting factors corresponding respectively to the plurality of corrected received signals and an error derived by the adaptive algorithm; and
an estimating unit which estimates respectively residual components of the frequency offsets contained in the plurality of corrected received signals, based on the plurality of derived weighting factors and the error derived by the adaptive algorithm,
wherein said estimating unit estimates the residual components of frequency offsets by multiplying respectively the error derived by the adaptive algorithm by complex conjugation of the plurality of corrected received signals and by extracting imaginary components from a division result where the multiplication result is divided by the plurality of derived weighting factors, and
wherein said correcting unit corrects the frequency offsets respectively by reflecting the estimated residual components of frequency offsets.

2. A frequency offset correcting apparatus according to claim 1, further comprising a frequency conversion unit which performs frequency conversion respectively on a plurality of radio frequency signals received respectively by the plurality of antennas, based on a plurality of oscillation signals outputted respectively from a plurality of frequency oscillators and which outputs the frequency-converted signals to said correcting unit as the plurality of received signals.

3. A frequency offset correcting apparatus according to claim 2, further comprising a weighting unit which weights the plurality of corrected received signals with the plurality of derived weighting factors, respectively.

4. A frequency offset correcting apparatus according to claim 2, further comprising a frequency-domain conversion unit which converts respectively the plurality of corrected received signals to those in frequency domain and which outputs a plurality of signals in frequency domain for the respective plurality of corrected received signals,
wherein said processing unit derives respectively a plurality of weighting factors and errors, derived by the adaptive algorithm, corresponding respectively to the plurality of signals in frequency domain, by applying the adaptive algorithm to among the plurality of corrected received signals in units of one signal in frequency domain mutually associated thereamong, and
wherein said estimating unit estimates the residual components of frequency offset, based on the plurality of weighting factors and errors, derived by the adaptive algorithm, corresponding respectively to the plurality of signals in frequency domain.

5. A frequency offset correcting apparatus according to claim 4, wherein said estimating unit estimates the residual components of frequency offset over a unit in which the plurality of corrected received signals are to be converted to those in frequency domain.

6. A frequency offset correcting apparatus according to claim 4, further comprising a weighting unit which weights the plurality of signals in frequency domain with the plurality of derived weighting factors, respectively.

7. A frequency offset correcting apparatus according to claim 1, further comprising a weighting unit which weights the plurality of corrected received signals with the plurality of derived weighting factors, respectively.

8. A frequency offset correcting apparatus according to claim 1, further comprising a frequency-domain conversion unit which converts respectively the plurality of corrected received signals to those in frequency domain and which outputs a plurality of signals in frequency domain for the respective plurality of corrected received signals,
wherein said processing unit derives respectively a plurality of weighting factors and errors, derived by the adaptive algorithm, corresponding respectively to the plurality of signals in frequency domain, by applying the adaptive algorithm to among the plurality of corrected received signals in units of one signal in frequency domain mutually associated thereamong, and
wherein said estimating unit estimates the residual components of frequency offsets, based on the plurality of weighting factors and errors, derived by the adaptive algorithm, corresponding respectively to the plurality of signals in frequency domain.

9. A frequency offset correcting apparatus according to claim 8, wherein said estimating unit estimates the residual components of frequency offset over a unit in which the plurality of corrected received signals are to be converted to those in frequency domain.

10. A frequency offset correcting apparatus according to claim 8, further comprising a weighting unit which weights the plurality of signals in frequency domain with the plurality of derived weighting factors, respectively.

11. A frequency offset estimating method characterized in that an adaptive algorithm is applied to a plurality of received signals corresponding respectively to a plurality of antennas so as to respectively derive a plurality of weighting factors corresponding respectively to the plurality of received signals and an error derived by the adaptive algorithm, and then frequency offsets contained in the plurality of received signals are respectively estimated, by multiplying respectively the error derived by the adaptive algorithm by complex conjugation of the plurality of corrected received signals and by extracting imaginary components from a division result where the multiplication result is divided by the plurality of derived weighting factors.

12. A computer readable storage medium having a program causing a computer to perform the steps of:

outputting, from a memory, frequency offsets contained in a plurality of received signals that correspond respectively to a plurality of antennas and correcting respectively the outputted frequency offsets;

applying an adaptive algorithm to the plurality of corrected received signals so as to derive a plurality of weighting factors corresponding respectively to the plurality of corrected received signals and an error derived by the adaptive algorithm; and estimating respectively residual components of the frequency offsets contained in the plurality of corrected received signals, based on the plurality of derived weighting factors and the error derived by the adaptive algorithm, wherein said estimating estimates the residual components of frequency offsets by multiplying respectively the error derived by the adaptive algorithm by complex conjugation of the plurality of corrected received signals and by extracting imaginary components from a division result where the multiplication result is divided by the plurality of derived weighting factors, and wherein said correcting is such that the frequency offsets stored in the memory is updated by the estimated residual components of the frequency offsets.

* * * * *